United States Patent
Yildiz

(10) Patent No.: US 8,312,285 B2
(45) Date of Patent: Nov. 13, 2012

(54) GLOBAL PROFILE MANAGEMENT METHOD AND SYSTEM

(75) Inventor: Mehmet Yildiz, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 12/631,967

(22) Filed: Dec. 7, 2009

(65) Prior Publication Data

US 2011/0138171 A1 Jun. 9, 2011

(51) Int. Cl.
*H04L 29/06* (2006.01)
*H04L 9/32* (2006.01)
*G06F 21/00* (2006.01)
*G06F 7/04* (2006.01)

(52) U.S. Cl. ............ 713/182; 713/159; 713/172; 726/2; 726/26

(58) Field of Classification Search .................. 713/185, 713/159, 172, 182; 726/2, 26
See application file for complete search history.

(56) References Cited

U.S. PATENT DOCUMENTS

| 7,636,941 | B2 * | 12/2009 | Blinn et al. ...................... 726/21 |
| 2005/0239447 | A1 * | 10/2005 | Holzman et al. ............ 455/414.3 |
| 2006/0206616 | A1 * | 9/2006 | Brown .......................... 709/229 |
| 2008/0114869 | A1 | 5/2008 | Thayer et al. |
| 2008/0155669 | A1 * | 6/2008 | Harik et al. ....................... 726/6 |
| 2009/0055404 | A1 | 2/2009 | Heiden et al. |
| 2009/0117883 | A1 * | 5/2009 | Coffing et al. ............. 455/414.1 |
| 2011/0078196 | A1 * | 3/2011 | Jorgensen ..................... 707/783 |
| 2011/0126122 | A1 * | 5/2011 | Forman et al. ................ 715/745 |

* cited by examiner

*Primary Examiner* — Mohammad W Reza
(74) *Attorney, Agent, or Firm* — Schmeiser, Olsen & Watts; John Pivnichny

(57) ABSTRACT

A profile management method and system. The method includes retrieving by a computer processor from a user of social network, a user request for generating a profile. The computer processor retrieves user data and an encrypted master security token comprising an identifier associated with the user. The computer processor generates the profile with the user data and associates the profile with the encrypted master security token. The computer processor receives from the social network a request associated with a membership to the social network. The computer system adds communication data to the encrypted master security token and enables access to the profile based on the encrypted master security token. The computer processor transmits to said first social network, a copy of the profile.

20 Claims, 3 Drawing Sheets

GLOBAL PROFILE MANAGEMENT METHOD AND SYSTEM

FIELD OF THE INVENTION

The present invention relates to a method and associated system for globally managing a profile associated with multiple social networks with minimum possible effort.

BACKGROUND OF THE INVENTION

Managing data typically comprises an inefficient process with little flexibility. Accordingly, there exists a need in the art to overcome at least some of the deficiencies and limitations described herein above.

SUMMARY OF THE INVENTION

The present invention provides a method comprising: method comprising: receiving, by a computer processor of a computing apparatus from a first social network, a first user request for generating a profile associated with a user; retrieving, by said computer processor, first data associated with said user; retrieving, by said computer processor, an encrypted master security token comprising an identifier associated with said user; generating, by said computer processor, said profile, wherein said profile comprises said first data; associating, by said computer processor, said encrypted master security token with said profile; storing, by said computer processor, said encrypted master security token attached to said profile; receiving, by said computer processor from said first social network via said user, a request associated with a membership to said first social network; adding, by said computer processor to said encrypted master security token, first communication data identifying a pathway between said computer processor and said first social network; enabling, by said computer processor, access to said profile based on said encrypted master security token; and transmitting, by said computer processor to said first social network in response to said enabling, a copy of said profile.

The present invention provides a computing system comprising a computer processor coupled to a computer-readable memory unit, said memory unit comprising instructions that when enabled by the computer processor implements a global profile management method comprising: receiving, by said computer processor from a first social network, a first user request for generating a profile associated with a user; retrieving, by said computer processor, first data associated with said user; retrieving, by said computer processor, an encrypted master security token comprising an identifier associated with said user; generating, by said computer processor, said profile, wherein said profile comprises said first data; associating, by said computer processor, said encrypted master security token with said profile; storing, by said computer processor, said encrypted master security token attached to said profile; receiving, by said computer processor from said first social network via said user, a request associated with a membership to said first social network; adding, by said computer processor to said encrypted master security token, first communication data identifying a pathway between said computer processor and said first social network; enabling, by said computer processor, access to said profile based on said encrypted master security token; and transmitting, by said computer processor to said first social network in response to said enabling, a copy of said profile.

The present invention advantageously provides a simple method and associated system capable of managing data.

DETAILED DESCRIPTION OF THE INVENTION

Figure 1:
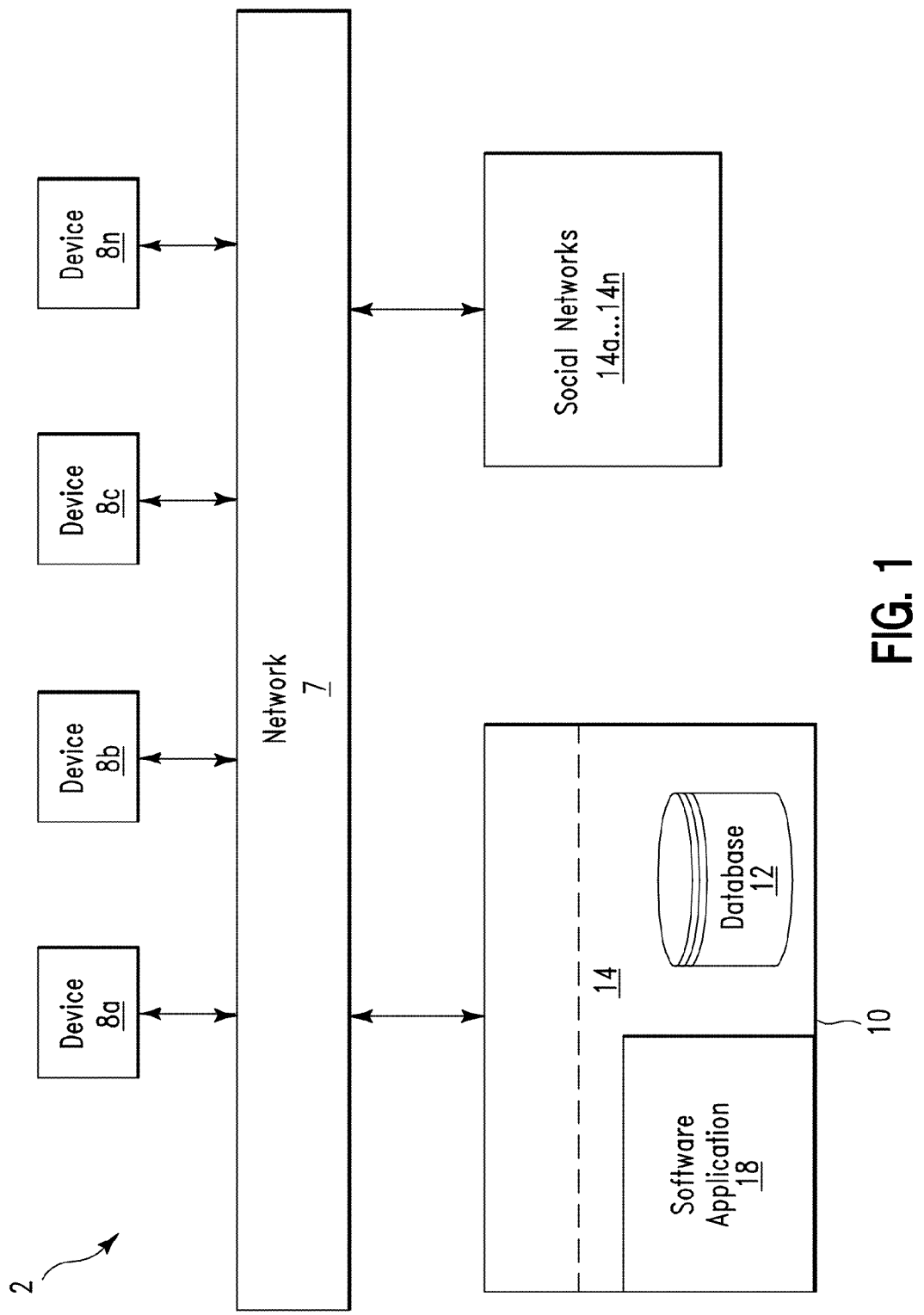
FIG. 1 illustrates a system for or globally managing user profiles associated with multiple social networks, in accordance with embodiments of the present invention.

FIG. 1 illustrates a system 5 for globally managing user profiles associated with multiple social networks 14a . . . 14n, in accordance with embodiments of the present invention. The user profiles may be managed by a single entity. System 5 enables users to apply for a profile, register (once) with a profile service, and obtain a code. Using this code, a user may download his/her preferred profile templates. Each user has preferred profile templates associated with a single user profile enabling multiple profile formats to be generated from a single user profile.

System 5 of FIG. 1 comprises devices 8a . . . 8n and social networks 14a . . . 14n connected through a network 7 to a computing system 10. Network 7 may comprise any type of network including, inter alia, a telephone network, a cellular telephone network, a local area network, (LAN), a wide area network (WAN), the Internet, etc. Devices 8a . . . 8n may comprise any type of devices capable of implementing a social network including, inter alia, a telephone, a cellular telephone, a digital assistant (PDA), a video game system, an audio/video player, a personal computer, a laptop computer, a computer terminal, etc. Each of devices 8a . . . 8n may comprise a single device or a plurality of devices. Devices 8a . . . 8n are used by end users for communicating with each other via social networks 14a . . . 14n. Additionally, devices 8a . . . 8n are used by end users for communicating with computing system 10. Computing system 10 may comprise any type of computing system(s) including, inter alia, a personal computer (PC), a server computer, a database computer, etc. Computing system 10 is used to allow users to retrieve multiple user profile templates associated with a single user profile using devices 8a . . . 8n. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all user profiles and profile templates. Social networks 14a . . . 14n may comprise any number and any type of different social network systems associated with any type of social networks. Software application 18 enables the following functionality associated with generating and modifying a user profile associated with multiple social networks:

1. A user applies to a social/professional network (e.g., one of social networks 14a . . . 14n) for membership. The application is a function of the social network which provides the service.
2. The social network transfers the user to a (global profile managing) computing system (e.g., computing system 10)

to initially generate a user profile that may be used for a plurality of different social networks. A network connection is enabled between the service provider (i.e., the social network) and software application 18. A DNS forward or any automatic network name resolution techniques may be used. To generate a profile, a security token which includes identifiers for the user is generated. The security token is exchanged as a network communication enabler. The security token may comprise an encrypted token for security and purposes. The security token may replicate itself in real-time to multiple servers and additional hosting devices to speed up processes. The security token is based on master to follower principle. For example, a single master token is generated. The single master token leads n number of additional tokens that each comprise an almost identical copy of the single master token. The master token comprises an algorithm (a command) for enabling the code to replicate itself n times. The number n depends on a number selected during implementation for performance, security, and availability targets. System 2 generates one master token and n number of additional similar follower tokens so that if the integrity of a follower token is compromised, another check point algorithm in the master token will assess the integrity, discard the damaged follower token, and replace the damaged follower token with another follower token. The master token comprises an algorithm with three main components and additional sub components. The three main components are as follows:
  A. User details comprising multiple parameters. The parameters may include, inter alia, identification information, user preferred information, information published about the user on public networks, user security options, etc.
  B. Network and infrastructure details comprising all network, communications, and additional infrastructure details such as, inter alia, servers, databases, middleware, storage units and locations, network related information (e.g., routing, package transfer, network security, etc), etc.
  C. Application/services details comprising application interfaces, services such as financial, authentication, legal etc.
3. A global profile center enabled by software application 18 (e.g., through a wizard) retrieves a user's information and allocates the user with a unique security token. Software application 18 comprises a security component that generates a security token and transmit the security token to a requesting application via a package (i.e., a piece of functional code). The security token stores user specific information and additional structured key information. For example, each security token comprises login details for a requested user. The login details are provided by an initiating authentication server from any network. The security token stores encrypted system information. Additionally, the security token records and stores a communication pathway and associated parameters.
4. All user profile information is retrieved and processed by a centralized database (e.g., database 12 in FIG. 1). A specific database enabling a database management system (e.g., DB2) is generated. Software application 18 is structured in a way that it can be processed in any available processing unit in any part of the globe as long as it is an authenticated server. For example, a security token may direct a process to an idle server using a shortest path in the network.
5. Software application 18 additionally enables language translation services from a single language to multiple desired languages. Software application 18 comprises a front end package that links to a backend language translation processing service/server thereby generating a customized package for profile management. The customized package comprises multiple translation templates based on a user language and styles. The customized package (i.e., by linking to many translation sources) enables a user to use a best available and/or most optimum translation service.
6. Software application 18 optionally provides financial services when a service is required to be based on fee a structure. Software application 18 is linked to an e-commerce service provider via a small front-end package.
7. The user profile is copied to a requesting network. A transport protocol will enable the transmission of a package including user profile information to a network server of the social networking provider.
8. If a user chooses to update his/her profile, the social network automatically directs the request to software application 18.
9. Software application 18 ensures that updates to user profiles take place in all sub components (mandatory and optional) including in output files such as, inter alia, translations. A data replication and system synchronization script may be implemented to ensure that updates to user profiles take place in all sub components.
10. Software application 18 comprises an operations center for management functions including performance. For example, an enterprise level systems management application may be used to customize operational requirements of software application 18. Software application 18 may comprise monitoring and alerting functionality. Additionally, software application 18 may comprise a structure that includes essential systems management data. System management data may be stored as hidden fields in the security token and may be recognized by software application 18 via a piece of code comprising an agent to an operations center.
11. Software application 18 comprises built-in disaster recovery subsystems including. A replica of software application 18 and supporting infrastructure may be provided to maintain continuity of services in case of any disaster affecting components of the original copy. The disaster recovery, business continuity, availability, and resilience aspect of the system 5 will additionally use the security token which may be replicated many times in a real time situation.
12. Software application 18 comprises an external interface engine which allows additional systems to read the profile information based on semantic web principles. Software application 18 allows available user information such as, inter alia, completed education, history of employment, financial details, etc. to be automatically added to a user profile. The security token is used to locate optional and additional or newly added user information content with the assistance of blank codes mapping any new kind of information.
13. Software application 18 enables archival functions to maintain version controls or any ethical or legal concerns and requirements. Additionally, the security token will accelerate an archival process and improve a recovery of lost data. The archival functions are based on a number of security tokens directing user information in any part of the infrastructure. The security tokens allow a user or administrator to recover any lost component instantly from the uniquely replicated tokens in the network.

Figure 2:
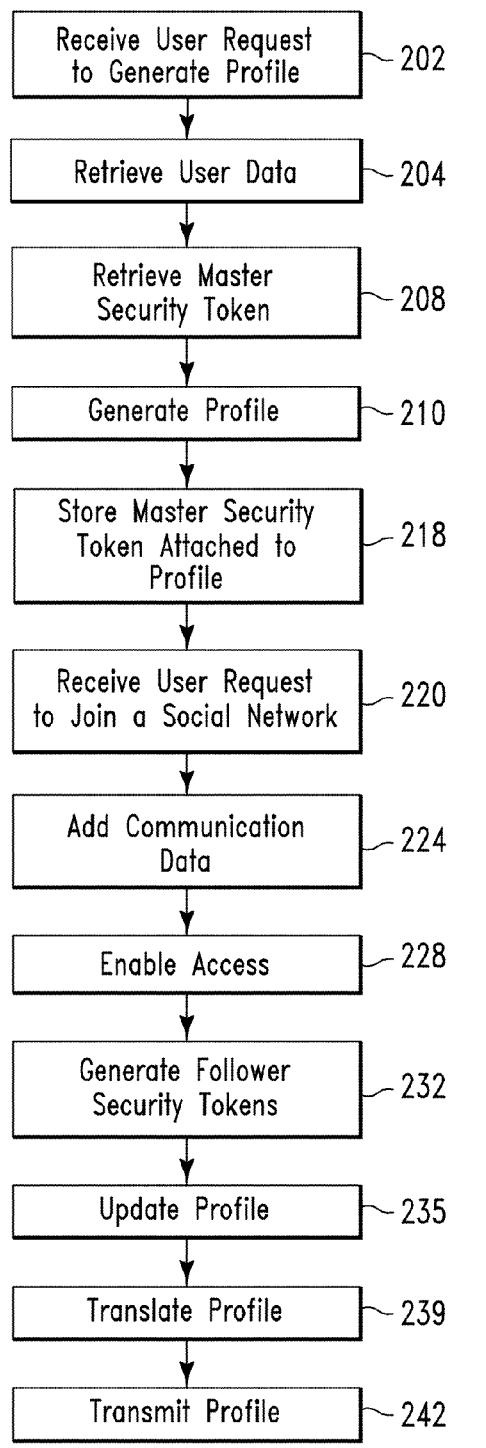
FIG. 2 illustrates a flowchart describing an algorithm used by the system of FIG. 1 for or globally managing user profiles associated with multiple social networks, in accordance with embodiments of the present invention.

FIG. 2 illustrates a flowchart describing an algorithm used by system 5 of FIG. 1 for globally managing user profiles associated with multiple social networks, in accordance with embodiments of the present invention. In step 202, a computing system (e.g., a computer processor of computing system 10 of FIG. 1) receives from a first social network, a first user request for generating a user profile associated with a user. In step 204, the computing system retrieves first user data associated with the user. The first user data may be retrieved from any existing user data. For example, user data may be retrieved from existing completed education data, existing history of employment data, existing financial details data, etc. In step 208, the computing system retrieves an encrypted master security token comprising an identifier associated with the user. In step 210, the computing system generates the user profile comprising the first user data. In step 218, the computing system associates the encrypted master security token with the user profile and stores the encrypted master security token attached to the user profile. The user profile and encrypted master security token may be further associated with, inter alia, a financial service entity, a language translation request, application and services data identifying financial services associated with the user and the first social network. In step 220, the computing system receives from a first social network via the user, a request associated with a membership to the first social network. In step 224, the computing system adds to said encrypted master security token, first communication data identifying a pathway between the computing system and the first social network. In step 228, the computing system enables access to the user profile based on the encrypted master security token. In step 232, the computing system generates follower encrypted security tokens from the encrypted master security token. Each follower encrypted security token comprises the identifier for the user retrieved from the encrypted master security token and copies of the user profile. Each follower encrypted security token is generated based on various conditions and situations associated with usage of the user profile. For example, the following implementation scenario describes a process for generating multiple follower encrypted security tokens associated with a single encrypted master security token:

1. Each encrypted follower security token is associated with the user profile.
2. A first encrypted follower security token is generated. The first encrypted follower security token comprises a first copy of the user profile and the first communication data.
3. A second encrypted follower security token is generated. The second encrypted follower security token comprises a second copy of the user profile, application and services data, and second communication data. The application and services data identifies financial services associated with the user and the first social network. The second communication data identifies a pathway between the computing system and financial services computing system associated with the financial services.
4. A third encrypted follower security token is generated. The third encrypted follower security token comprises a third copy of the user profile, language preferences data, and third communication data. The third communication data identifies a pathway between the computing system and a language preferences computing system comprising the language preferences data. The language preferences data comprises language preferences of the user.
5. The computing system may transmit the first encrypted follower security token to the first social network, the second updated encrypted follower security token to the finan-cial services computing system, and the third updated encrypted follower security token to the language translation computing system.

In step 235, the computing system may optionally (upon user command) update the user profile and generate an additional encrypted follower security token comprising the updated user profile. In step 239, the computing system may optionally (upon user command) translate the user profile (from a first language to a second language) and generate an additional encrypted follower security token comprising the translated user profile. In step 242, the computing system transmits the original encrypted master security token comprising the user profile to the first social network. Additionally or alternatively the computing system may transmit the follower encrypted security tokens comprising copies of the user profile to an associated destination (e.g., see the implementation example of step 232). The aforementioned process enabled by the algorithm of FIG. 2 may be repeated for the user for multiple different social networks.

Figure 3:
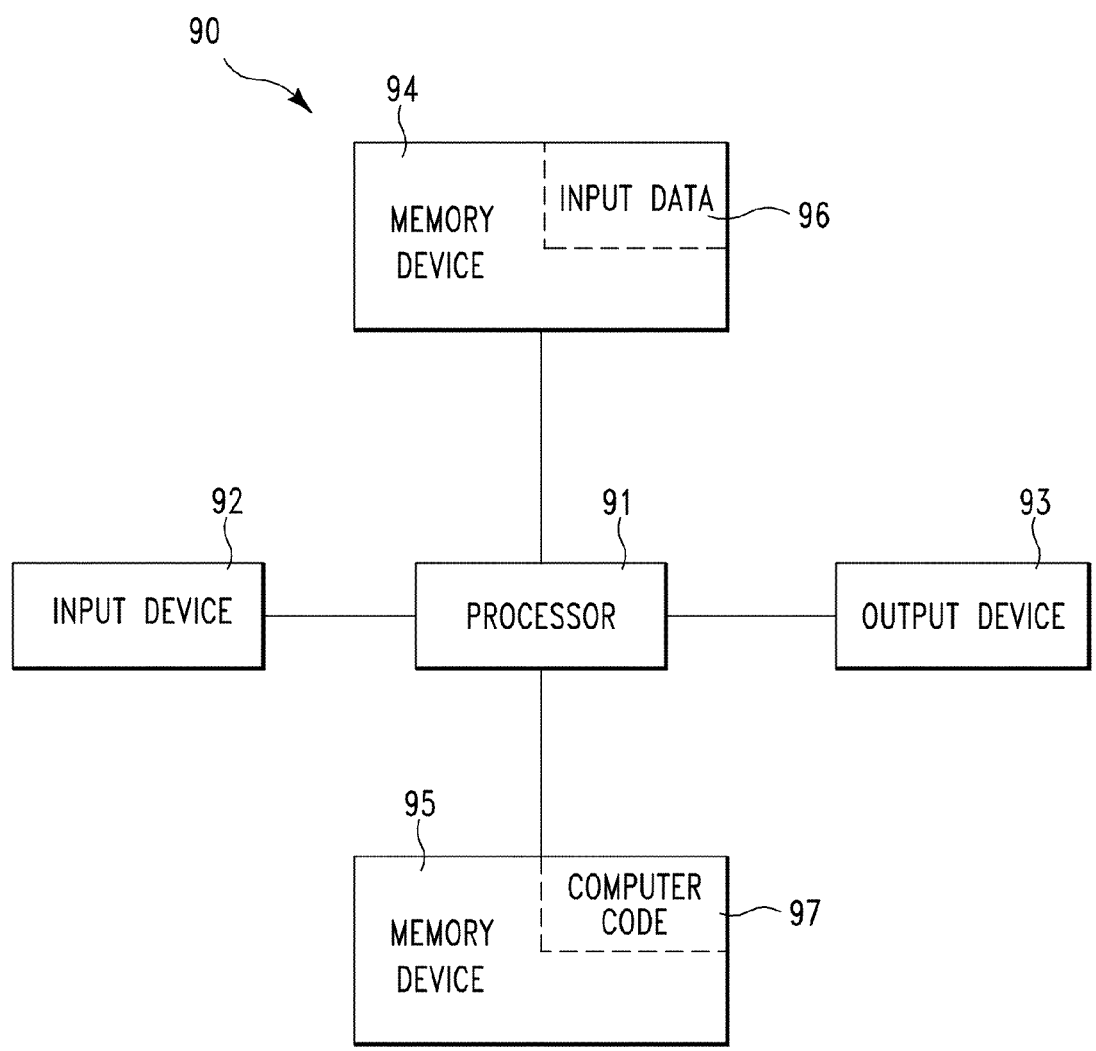
FIG. 3 illustrates a computer apparatus used for or globally managing user profiles associated with multiple social networks, in accordance with embodiments of the present invention.

FIG. 3 illustrates a computer apparatus 90 (e.g., computing system 10 of FIG. 1) used for globally managing user profiles associated with multiple social networks, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for globally managing user profiles associated with multiple social networks. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to globally manage user profiles associated with multiple social networks. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for globally managing user profiles associated with multiple social networks. In another embodiment, the invention provides a method that performs the process steps of the invention on a subscription, advertising, and/or fee basis. That is, a service provider, such as a Solution Integrator, could offer to globally manage user profiles associated with multiple social networks. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
receiving, by a computer processor of a computing apparatus from a first social network, a first user request for generating a profile associated with a user;
retrieving, by said computer processor, first data associated with said user;
retrieving, by said computer processor, an encrypted master security token comprising an identifier associated with said user;
generating, by said computer processor, said profile, wherein said profile comprises said first data;
associating, by said computer processor, said encrypted master security token with said profile;
storing, by said computer processor, said encrypted master security token attached to said profile;
receiving, by said computer processor from said first social network via said user, a request associated with a membership to said first social network;
adding, by said computer processor to said encrypted master security token, first communication data identifying a pathway between said computer processor and said first social network;
enabling, by said computer processor, access to said profile based on said encrypted master security token;
transmitting, by said computer processor to said first social network in response to said enabling, a copy of said profile; and
generating, by said computer processor, a plurality of encrypted follower security tokens associated with said encrypted master security token, wherein each encrypted follower security token of said plurality of encrypted follower security tokens comprises said identifier associated with said user;
associating, by said computer processor, each said encrypted follower security token with said profile;
generating, by said computer processor from a first encrypted follower security token of said plurality of encrypted follower security tokens, a first updated encrypted follower security token, wherein said generating said first updated encrypted follower security token comprises adding said first communication data and said first copy of said profile to said encrypted follower security token;
generating, by said computer processor from a second encrypted follower security token of said plurality of encrypted follower security tokens, a second updated encrypted follower security token, wherein said generating said second updated encrypted follower security token comprises adding a second copy of said profile, application and services data, and second communication data to said second encrypted follower security token, wherein said application and services data identifies financial services associated with said user and said first social network, and wherein said second communication data identifies a pathway between said computer processor and a financial services computing system associated with said financial services;
transmitting, by said computer processor to said first social network in response to said enabling, said first updated encrypted follower security token,
transmitting, by said computer processor to said financial services computing system in response to said enabling, said second updated encrypted follower security token.

2. The method of claim 1, further comprising:
receiving, by said computer processor from a second social network via said user, a request associated with a membership to said second social network, wherein said first social network differs from said second social network;
adding, by said computer processor to said encrypted master security token comprising said first communication data, second communication data identifying a pathway between said computer processor and said second social network;
enabling, by said computer processor, access to said profile based on said encrypted master security token; and
transmitting, by said computer processor to said second social network, a copy of said profile.

3. The method of claim 1, further comprising:
receiving, by said computer processor from said first user, a request for updating said profile;
retrieving, by said computer processor, second data associated with said user;
generating, by said computer processor, an updated profile comprising some of said first data and said second data;
associating, by said computer processor, said encrypted master security token with said updated profile; and
storing, by said computer processor, said encrypted master security token attached said updated profile.

4. The method of claim 1, further comprising:
associating, by said computer processor, said profile with a financial service entity.

5. The method of claim 1, further comprising:
monitoring, by said computer processor, access to said profile.

6. The method of claim 1, further comprising:
receiving, by said computer processor, a translation request for translating said profile from a first language to a second language differing from said first language;
translating, by said computer processor in response to said translation request, said profile into said second language; and
storing, by said computer processor, a copy of said profile comprising said second language.

7. The method of claim 1, further comprising:
generating, by said computer processor, an encrypted follower security token associated with said encrypted master security token, wherein said encrypted follower security token comprises said identifier associated with said user;

associating, by said computer processor, said encrypted follower security token with said profile;

adding, by said computer processor to said encrypted follower security token, said first communication data and said first copy of said profile;

transmitting, by said computer processor to said first social network in response to said enabling, said encrypted follower security token.

8. The method of claim 1, wherein said encrypted master security token comprises management data associated with a managing party of said first social network, wherein said management data is stored within hidden fields of said encrypted master security token.

9. The method of claim 1, further comprising:

adding, by said computer processor to said encrypted master security token, application and services data identifying financial services associated with said user and said first social network.

10. The method of claim 1, further comprising:

generating, by said computer processor from a third encrypted follower security token of said plurality of encrypted follower security tokens, a third updated encrypted follower security token, wherein said generating said third updated encrypted follower security token comprises adding a third copy of said profile, language preferences data, and third communication data to said third encrypted follower security token, wherein said third communication data identifies a pathway between said computer processor and a language preferences computing system comprising said language preferences data, and wherein said language preferences data comprises language preferences of said user; and transmitting, by said computer processor to a language translation computing system in response to said enabling, said third updated encrypted follower security token.

11. A process for supporting computer infrastructure, said process comprising providing at least one support service for at least one of creating, integrating, hosting, maintaining, and deploying computer-readable code in said computer processor, wherein the code in combination with the computer processor is capable of performing the method of claim 1.

12. A computing system comprising a computer processor coupled to a computer-readable memory unit, said memory unit comprising instructions that when enabled by the computer processor implements a global profile management method comprising:

receiving, by said computer processor from a first social network, a first user request for generating a profile associated with a user;

retrieving, by said computer processor, first data associated with said user;

retrieving, by said computer processor, an encrypted master security token comprising an identifier associated with said user;

generating, by said computer processor, said profile, wherein said profile comprises said first data;

associating, by said computer processor, said encrypted master security token with said profile;

storing, by said computer processor, said encrypted master security token attached to said profile;

receiving, by said computer processor from said first social network via said user, a request associated with a membership to said first social network;

adding, by said computer processor to said encrypted master security token, first communication data identifying a pathway between said computer processor and said first social network;

enabling, by said computer processor, access to said profile based on said encrypted master security token; and transmitting, by said computer processor to said first social network in response to said enabling, a copy of said profile; and generating, by said computer processor, a plurality of encrypted follower security tokens associated with said encrypted master security token, wherein each encrypted follower security token of said plurality of encrypted follower security tokens comprises said identifier associated with said user;

associating, by said computer processor, each said encrypted follower security token with said profile;

generating, by said computer processor from a first encrypted follower security token of said plurality of encrypted follower security tokens, a first updated encrypted follower security token, wherein said generating said first updated encrypted follower security token comprises adding said first communication data and said first copy of said profile to said encrypted follower security token;

generating, by said computer processor from a second encrypted follower security token of said plurality of encrypted follower security tokens, a second updated encrypted follower security token, wherein said generating said second updated encrypted follower security token comprises adding a second copy of said profile, application and services data, and second communication data to said second encrypted follower security token, wherein said application and services data identifies financial services associated with said user and said first social network, and wherein said second communication data identifies a pathway between said computer processor and a financial services computing system associated with said financial services;

transmitting, by said computer processor to said first social network in response to said enabling, said first updated encrypted follower security token, transmitting, by said computer processor to said financial services computing system in response to said enabling, said second updated encrypted follower security token.

13. The computing system of claim 12, wherein said method further comprises:

receiving, by said computer processor from a second social network via said user, a request associated with a membership to said second social network, wherein said first social network differs from said second social network;

adding, by said computer processor to said encrypted master security token comprising said first communication data, second communication data identifying a pathway between said computer processor and said second social network;

enabling, by said computer processor, access to said profile based on said encrypted master security token; and transmitting, by said computer processor to said second social network, a copy of said profile.

14. The computing system of claim 12, wherein said method further comprises:

receiving, by said computer processor from said first user, a request for updating said profile;

retrieving, by said computer processor, second data associated with said user;

generating, by said computer processor, an updated profile comprising some of said first data and said second data;

associating, by said computer processor, said encrypted master security token with said updated profile; and storing, by said computer processor, said encrypted master security token attached said updated profile.

15. The computing system of claim 12, wherein said method further comprises:

associating, by said computer processor, said profile with a financial service entity.

16. The computing system of claim 12, wherein said method further comprises:

monitoring, by said computer processor, access to said profile.

17. The computing system of claim 12, wherein said method further comprises:

receiving, by said computer processor, a translation request for translating said profile from a first language to a second language differing from said first language;

translating, by said computer processor in response to said translation request, said profile into said second language; and storing, by said computer processor, a copy of said profile comprising said second language.

18. The computing system of claim 12, wherein said method further comprises:

generating, by said computer processor, an encrypted follower security token associated with said encrypted master security token, wherein said encrypted follower security token comprises said identifier associated with said user;

associating, by said computer processor, said encrypted follower security token with said profile;

adding, by said computer processor to said encrypted follower security token, said first communication data and said first copy of said profile;

transmitting, by said computer processor to said first social network in response to said enabling, said encrypted follower security token.

19. The computing system of claim 12, wherein said method further comprises:

generating, by said computer processor from a third encrypted follower security token of said plurality of encrypted follower security tokens, a third updated encrypted follower security token, wherein said generating said third updated encrypted follower security token comprises adding a third copy of said profile, language preferences data, and third communication data to said third encrypted follower security token, wherein said third communication data identifies a pathway between said computer processor and a language preferences computing system comprising said language preferences data, and wherein said language preferences data comprises language preferences of said user; and transmitting, by said computer processor to a language translation computing system in response to said enabling, said third updated encrypted follower security token.

20. A computer program product, comprising a computer readable storage device storing a computer readable program code, said computer readable program code configured to perform a method upon being executed by a computer processor of a computing apparatus, said method comprising:

receiving, by said computer processor from a first social network, a first user request for generating a profile associated with a user;

retrieving, by said computer processor, first data associated with said user;

retrieving, by said computer processor, an encrypted master security token comprising an identifier associated with said user;

generating, by said computer processor, said profile, wherein said profile comprises said first data;

associating, by said computer processor, said encrypted master security token with said profile;

storing, by said computer processor, said encrypted master security token attached to said profile;

receiving, by said computer processor from said first social network via said user, a request associated with a membership to said first social network;

adding, by said computer processor to said encrypted master security token, first communication data identifying a pathway between said computer processor and said first social network;

enabling, by said computer processor, access to said profile based on said encrypted master security token; and transmitting, by said computer processor to said first social network in response to said enabling, a copy of said profile; and generating, by said computer processor, a plurality of encrypted follower security tokens associated with said encrypted master security token, wherein each encrypted follower security token of said plurality of encrypted follower security tokens comprises said identifier associated with said user;

associating, by said computer processor, each said encrypted follower security token with said profile;

generating, by said computer processor from a first encrypted follower security token of said plurality of encrypted follower security tokens, a first updated encrypted follower security token, wherein said generating said first updated encrypted follower security token comprises adding said first communication data and said first copy of said profile to said encrypted follower security token;

generating, by said computer processor from a second encrypted follower security token of said plurality of encrypted follower security tokens, a second updated encrypted follower security token, wherein said generating said second updated encrypted follower security token comprises adding a second copy of said profile, application and services data, and second communication data to said second encrypted follower security token, wherein said application and services data identifies financial services associated with said user and said first social network, and wherein said second communication data identifies a pathway between said computer processor and a financial services computing system associated with said financial services;

transmitting, by said computer processor to said first social network in response to said enabling, said first updated encrypted follower security token, transmitting, by said computer processor to said financial services computing system in response to said enabling, said second updated encrypted follower security token.

* * * * *